United States Patent [19]

O'Brien et al.

[11] Patent Number: 6,141,771
[45] Date of Patent: Oct. 31, 2000

[54] METHOD AND SYSTEM FOR PROVIDING A TRUSTED MACHINE STATE

[75] Inventors: John Timothy O'Brien, Louisville; David G. Hostetter, Boulder, both of Colo.

[73] Assignee: International Business Machines Corporation, Armonk, N.Y.

[21] Appl. No.: 09/019,768

[22] Filed: Feb. 6, 1998

[51] Int. Cl.⁷ .................................................. G06F 11/00
[52] U.S. Cl. ................... 714/15; 714/1; 714/2; 714/23; 714/36; 714/48; 714/55; 707/202; 707/203; 709/202; 709/208; 709/209; 711/162; 711/165
[58] Field of Search .................... 714/1, 15, 23, 714/2, 36, 48, 55; 709/202, 209, 208; 707/203, 202; 711/165, 162

[56] References Cited

U.S. PATENT DOCUMENTS

| | | | |
|---|---|---|---|
| 4,918,653 | 4/1990 | Johri et al. ........................... | 713/202 |
| 5,345,583 | 9/1994 | Davis ................................... | 714/23 |
| 5,551,051 | 8/1996 | Silverthorn et al. ................ | 714/48 |
| 5,581,723 | 12/1996 | Hasbun et al. ..................... | 711/103 |

*Primary Examiner*—Robert W. Beausoliel, Jr.
*Assistant Examiner*—Wasseem H. Hamdan
*Attorney, Agent, or Firm*—Sawyer & Associates; Esther Klein

[57] ABSTRACT

A system and method for providing a trusted machine state in a data processing system is disclosed. The data processing system includes a memory. The trusted machine state is stored in a first portion of the memory. The method and system include saving the trusted machine state in a second portion of the memory and reinitializing a portion of the memory. The portion of memory is separate from the second of memory. The method and system further include restoring the trusted machine state in the memory. According to the method and system disclosed herein, the data processing system may recover from failures and resume operation. Moreover, a non-disruptive code load, in which a new program can be loaded without disrupting system operations, may be performed.

43 Claims, 5 Drawing Sheets

METHOD AND SYSTEM FOR PROVIDING A TRUSTED MACHINE STATE

FIELD OF THE INVENTION

The present invention relates to data processing systems employing a processor and more particularly to a method and system for saving and restoring a trusted machine state, thereby providing greater flexibility and reliability for the system.

BACKGROUND OF THE INVENTION

Many systems employing microprocessors utilize a trusted machine state. A trusted machine state includes data retained by the system in order to more smoothly resume operation after reinitialization. This data can be used to aid the system in recovering from certain errors and to provide a non-disruptive code load (NDCL).

Systems using processors may be subject to failures which halt normal operation. For some of these failures, the system can recover from the failure and resume operation by initializing at least a part of memory. For example, conventional embedded control subsystems are used in a variety of devices, from simple video cassette recorders to data storage subsystems used in complex computer systems. These control subsystems typically control the device and allow the device to communicate with a user or host computer. Certain errors in conventional control subsystems halt normal processing. In order to continue execution, the conventional control subsystem reinitializes memory, then resumes operation. This allows the conventional control subsystem to continue operation despite the occurrence of the error.

During reinitialization, most local and shared memory is reinitialized. This allows data which may have caused the error to be removed from memory. However, the trusted machine state is typically retained. The data preserved in the trusted machine state allow the system to more smoothly resume operation. Typically, this data includes information relating to the certain variables used in the control subsystem.

In addition to use in recovery from certain errors, trusted machine states are also used in performing a conventional NDCL. The conventional NDCL allows a device currently running a particular set of code to switch from one version of the code to another without having to restart the system. In conventional NDCLs using a trusted machine state, the portion of memory retaining the trusted machine state is not reinitialized in the processes of halting the old program, loading the new program, and initializing the system. As a result, the new program is loaded without disrupting system operations. The data retained in the trusted machine state enables the device to resume operations which were in progress when the switch from one version of code to another took place.

A conventional method for providing a trusted machine state is simply to avoid reinitializing the portions of memory in which data for the trusted machine state is stored. In order to accomplish this, a software developer would typically omit code for reinitializing portions of memory in which the trusted machine state resides. As a result, only those portions of memory which do not hold a trusted machine state are typically reinitialized.

Although reinitialization of certain portions of memory should allow conventional systems to recover from certain errors and provide NDCLs, conventional methods for providing a trusted machine state are problematic. When a developer merely forgets to provide for reinitialization of memory an unintended trusted machine state arises. As a result, data is unintentionally retained through the reinitialization process. If this data was incorrect at the time an error halted operation or if the data is simply inconsistent with the state of other variables which were reinitialized, another error could occur after the system resumes operation. As systems become more complex, there is a greater probability of unintended trusted machine states. There is also a corresponding increase in the probability that an unintended trusted machine state will cause errors in execution once operation has resumed.

In addition, intended and unintended trusted machine states affect NDCLs. Because conventional methods for preserving the trusted machine states function by retaining data at specific addresses in memory, alterations between version of code must be limited in order to allow the switch from one version of code to another to be performed in a non-disruptive fashion which preserves the trusted machine state. Either the old and new versions of code must utilize the same addresses for the trusted machine state or the new code must read the addresses corresponding to the trusted machine state in the old code and write the trusted machine state to the addresses used by the new code. In either case, the developer of the new code should be confident that all of the old code's intended trusted machine states have been properly identified. Because trusted machine states are defined by the absence of reinitialization code, identifying intended or unintended trusted machine states is difficult and error prone. Thus, it is difficult to ensure that all trusted machine states are identified, particularly for a system having a great deal of code or numerous developers. Moreover, unintended trusted machine states could cause failures after the NDCL has been performed.

Accordingly, what is needed is a system and method for providing a trusted machine state with reduced probability for errors. The present invention addresses such a need.

SUMMARY OF THE INVENTION

The present invention provides a method and system for providing a trusted machine state in a data processing system. The data processing system includes a memory. The trusted machine state is stored in a first portion of the memory. The method and system comprise saving the trusted machine state in a second portion of the memory and reinitializing a portion of the memory. The portion of memory which is reinitialized is separate from the second portion of memory. The method and system further comprise restoring the trusted machine state.

According to the system and method disclosed herein, the present invention allows for saving and restoring a trusted machine state consisting only of the intended trusted machine state, thereby increasing overall system performance and reliability. Furthermore, the system and method disclosed herein allow the trusted machine state to be restored to memory addresses which differ from the addresses at which the trusted machine state was originally stored.

DETAILED DESCRIPTION OF THE INVENTION

The present invention relates to an improvement in a trusted machine state used in systems employing a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A trusted machine state is a reduced amount of information used by a system to restart with limited disruption after a reinitialization. Trusted machine states are utilized in a variety of systems to recover from errors or allow for non-disruptive code loads (NDCL).

Figure 1:
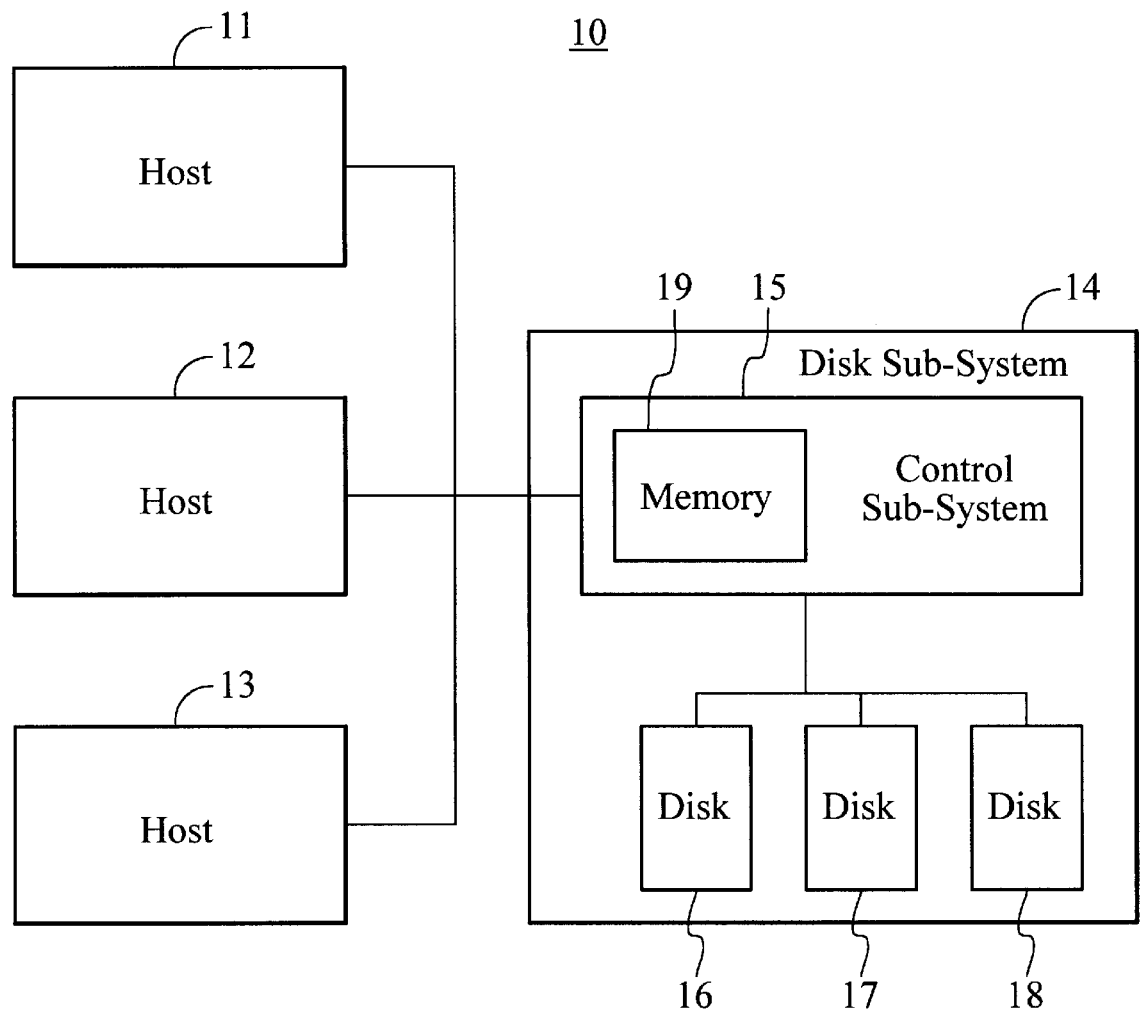
FIG. 1 is a block diagram of a conventional disk subsystem.

For example, FIG. 1 is a block diagram of a conventional computer system 10 which may utilize trusted machine states. The computer system 10 includes hosts 11, 12, and 13, and disk subsystem 14. Disk subsystem 14 includes an embedded control subsystem 15 and a plurality of disks 16, 17, and 18. The control subsystem 15 allows the disk subsystem 14 to communicate with host computers 11, 12, and 13. The control subsystem 15 also allows the information to be written to or read from disks 16, 17, and 18. Within the control subsystem 15 is a memory 19 in which a plurality of processors (not shown) in control of the subsystem 15 store information regarding the operations being performed by the disk subsystem 14. In one embodiment, the control subsystem 15 also includes a cache memory (not shown). In this embodiment, the control subsystem 15 causes information to be transmitted to and from the cache. Using the cache, the disk subsystem 14 can mimic a very large, expensive disk that has certain characteristics, while data is actually stored on small inexpensive disks 16, 17, and 18.

As with many systems, the control subsystem 15 is subject to errors which may require reinitialization of the memory 19 for recovery. Such an error would result in incorrect behavior of the subsystem 14 or would prevent continued execution of a control program for the subsystem 14. Reinitialization typically allows recovery from the error.

For example, a software error could lead to an illegal condition, such as an inconsistent set of pointers in a linked list. Recovery from such an error can be accomplished by discarding the contents of the memory 19 for the control subsystem 15 and rebuilding the linked list during a reinitialization of the control subsystem 15. Similarly, a hardware malfunction could cause an error requiring reinitialization. In this case, reinitialization discards information regarding which pieces of hardware were performing operations at the time of the error. The control subsystem 15 restarts, marking the failed piece of hardware as having failed. Following the reinitialization, the failed hardware is not used.

Although most of local memory 19 may be reinitialized to recover from the error, the data stored in the memory 19 that constitutes the trusted machine state is retained. This allows the conventional control subsystem to continue operation with reduced disruption. Typically, the trusted machine state includes information relating to certain variables used in the control subsystem. For example, the trusted machine state for the disk subsystem 14 may include addresses storing data relating to a path to the host 11, 12, or 13 from which a pending command was received. This data allows the control subsystem to easily execute the last command from the host 11, 12, or 13 after operation is resumed. Thus, the trusted machine state reduces disruptions which might otherwise occur after reinitialization. Note, however, that if the data in the trusted machine state is incorrect at the time of the error, the control subsystem 15 will continue to use this incorrect information, perhaps causing another error.

Figure 2:
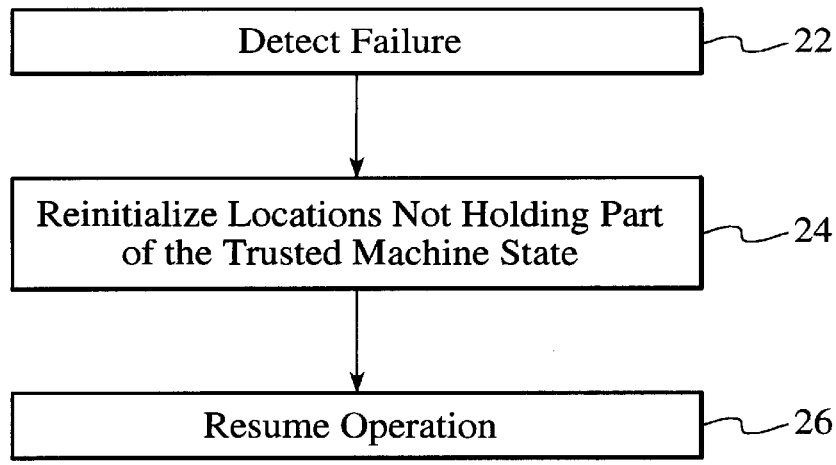
FIG. 2 is a flow chart depicting one conventional method for recovering from an error which halts operation.

FIG. 2 depicts a conventional method 20 for recovering from a failure using a trusted machine state. The existence of failure causing a halt in operations is detected via step 22. Locations in the memory 19 which do not hold a part of the trusted machine state are then reinitialized via step 24. Thus, the trusted machine state is conventionally preserved by not reinitializing the locations in memory which hold part of the trusted machine state. Operation is then resumed via step 26. Because most of the memory 19 has been reinitialized, it is likely that any data which may have caused the error has been discarded. At the same time, the information needed to smoothly restart the control program has been retained in the trusted machine state. As a result, the control subsystem 15 may recover from the error.

Trusted machine states are also used in NDCLs. An NDCL allows a system currently running code to load a new version of the code without completely initializing memory and restarting the new program. To accomplish this, information describing operations being performed by the system must be kept through the installation process so that the new version of code can complete these operations. In this respect, an NDCL is similar to recovery from an error which halts normal operation.

Figure 3:
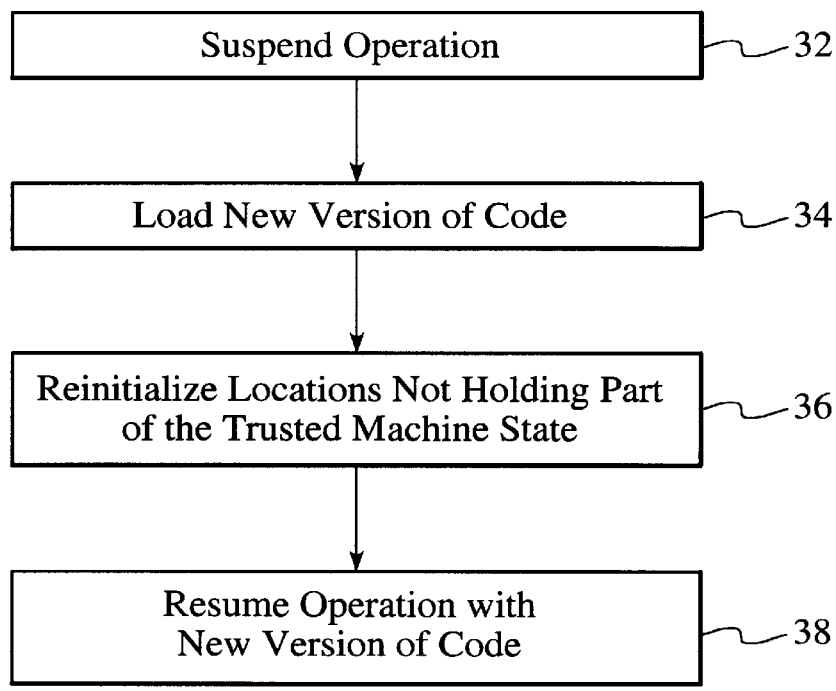
FIG. 3 is a flow chart depicting one conventional method for providing a non-disruptive code load.

FIG. 3 depicts a conventional method 30 for providing an NDCL. Operation of the old version of code is suspended via step 32. Thus, operation is intentionally suspended rather than being stopped by an error. The new version of code is loaded via step 34. Locations in memory 19 not holding part of the trusted machine state are reinitialized via step 36. Thus, as in step 24 of the method 20, step 36 is typically performed by not reinitializing the locations in the memory 19 which hold part of the trusted machine state. Operation is then resumed using the new code via step 38.

Although the conventional method for providing a trusted machine state utilized in the methods 20 and 30 of FIGS. 2 and 3 allows for recovery from faults and enables new code to be loaded in a non-disruptive fashion, those with ordinary skill in the art will realize that defining the trusted machine state by an omission of program instructions to initialize particular locations in memory may lead to failures of the subsystem 14.

The failure to reinitialize portions of memory creates the trusted machine state, preserving data from the time preceding the detection of a failure through the resumption of operations. As a result, if a software developer fails to remember to include a step in the program executing in the control subsystem 15 for reinitializing a piece of data, that piece of data becomes an unintended part of the trusted machine state. The unintended trusted machine state carries data through the reinitialization process.

The presence of this old data could adversely affect the recovery from a failure. In order to recover from a failure, data which caused the failure must be removed from the memory 19. Because of the unintended trusted machine state, more data is preserved through reinitialization. Because more data is preserved, data which caused the failure is more likely to remain in the memory 19. As a result, the control subsystem 15 is prone to fail again. Thus, even in a relatively simple system, unintended trusted machine states make the system apt likely to fail. More complex systems having more code are more likely to have unintended trusted machine states and are, therefore, even more likely to fail.

Conventional methods of providing a trusted machine state also adversely affect a developer's ability to provide an NDCL. An unintended trusted machine state in the old or new versions of code could cause the new code to detect failures after it has been loaded. For example, suppose a first variable, x, is an unintended portion of the trusted machine state. In addition, suppose that the variable x resides at a first address, A, while the old version of code is being executed and that the variable x resides at a second address, B, while the new version of code is being executed. Thus, the changes made to the new version of code cause the memory location in which the variable x was stored to change from the first address, A, to the second address, B. Furthermore, suppose that a second variable, y, resides at address B while the old version of code is being executed. Because the variable x is a portion of the trusted machine state, whether intended or not, the new version of code loaded via step 34 of the method 30 does not reinitialize the data stored at address B in the memory 19 via step 36. Because the old version of code stored the variable y at address B in the memory 19, the new version of code commences operation in step 38 with its variable x containing the data which was stored in the variable y while the old version of code was executing. If the old value of y is an illegal value for the variable x, the fact that the variable x is an unintended portion of the trusted machine state may cause an error in the execution of the new version of code.

Even if an unintended trusted machine state does not cause an error, an NDCL is made more difficult by the conventional method for providing a trusted machine state. In order to ensure that an NDCL can be performed, the new version of code must either retain the trusted machine state in the same locations as the old version of code or must move the trusted machine state from the set of addresses used by the old code to a new set of addresses. In order to accomplish either of these operations, the new version of code must be made aware of all parts of the trusted machine state. Because the absence of a step, reinitializing memory, defines a part of the trusted machine state, it is difficult to determine where a part of trusted machine state exists. This is particularly true for large, complex systems in which the code was written by many developers. Consequently, it is difficult for a developer to determine whether an NDCL can be properly performed. Even is it is possible to determine where each part of a trusted machine state exists, the need to preserve the trusted machine state in the same addresses or utilize the new code to read the trusted machine state from the addresses defined by the old code constrains the variations that can be made to a new version of software.

The present invention provides a method and system for providing a trusted machine state in a data processing system. The data processing system includes a memory. The trusted machine state includes data stored in a first portion of the memory. The method and system comprise saving the data in a second portion of the memory and reinitializing a portion of the memory separate from the second portion of memory. The method and system further comprise reading the data from the second portion of the memory and writing the data to a third portion of the memory. This third portion of the memory may or may not be the same as the first portion of memory from which the data was originally read.

The present invention will be described in terms of a method for recovering from a failure or providing an NDCL in a control subsystem. However, one of ordinary skill in the art will readily recognize that this method and system will operate effectively for other types of systems and other situations in which a trusted machine state is useful. The method and system find particular utility in any computer application that is faced with failure and a desire to continue operating after a failure in a fashion that is not too disruptive. Therefore, the method and system are effective for very simple systems, such as video cassette recorders, as well as complex systems, such as fault tolerant computer systems or data storage subsystems.

Figure 4:
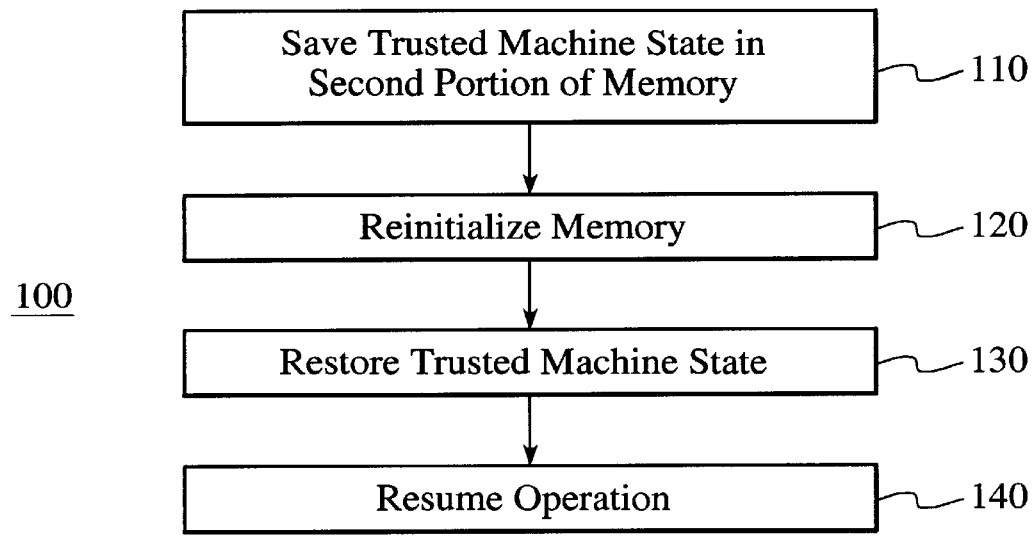
FIG. 4 is a flow chart depicting a method for providing a trusted machine state in accordance with the present invention.

To more particularly illustrate the method and system in accordance with the present invention, refer now to FIG. 4 depicting a flow chart of one embodiment of a method 100 for providing a trusted machine state in accordance with the present invention. Note that the method 100 can be utilized in any system, including the system 10 of FIG. 1, which employs a processor. The method 100 has particular utility in computer systems which are capable of recovering from particular errors through a reinitialization of a part of memory or for which an NDCL is desired. Consequently, the method 100 will be described in conjunction with the system 10. However, nothing prevents the use of the method 100 with another system having different characteristics and functions from the system 10.

The trusted machine state existing in a first portion of memory 19 is stored in a second portion of memory via step 110. A part of the memory 19 is then reinitialized via step 120. The part of the memory 19 that is reinitialized via step 120 does not include the second portion of memory in which the trusted machine state is stored. In one embodiment, the part of the memory 19 that is reinitialized includes the first portion of the memory 19 in which the trusted machine state existed. In a preferred embodiment, the part of the memory 19 that is reinitialized is as much of the memory 19 as can be reinitialized without too great a disruption in operation of the subsystem 14. Once reinitialization is completed, the trusted machine state is restored via step 130. Operation can then be resumed via step 140.

Figure 5:
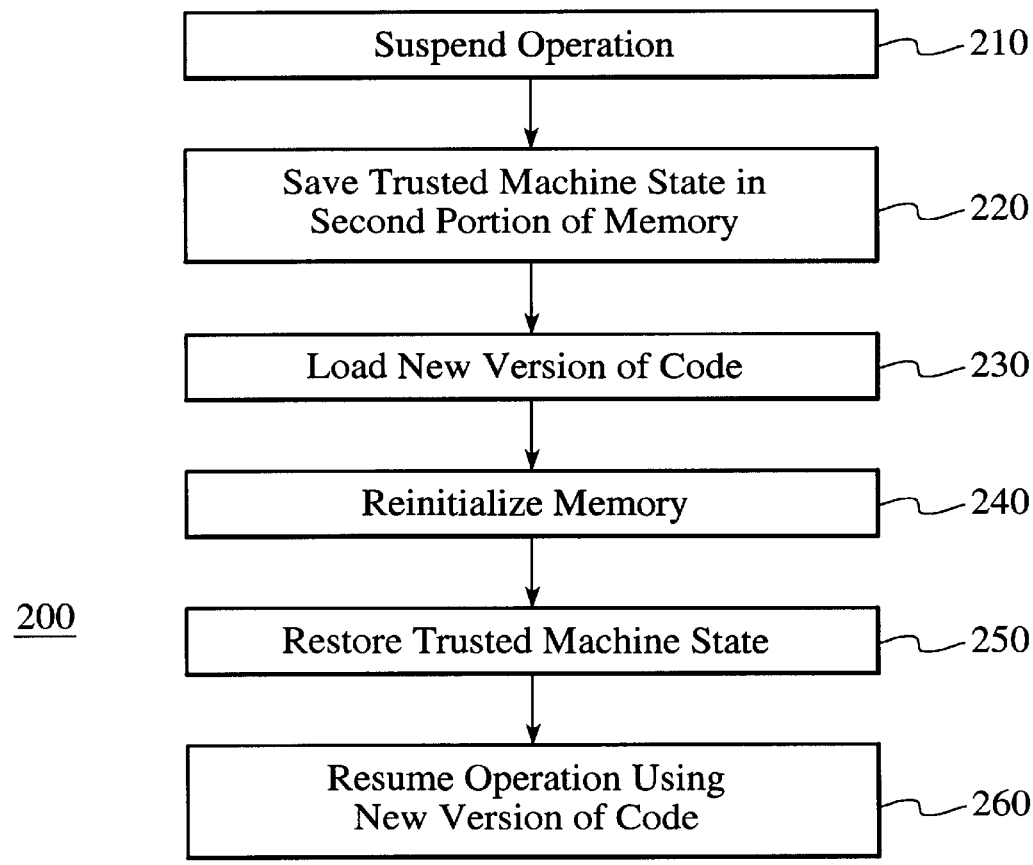
FIG. 5 is a flow chart depicting a method for providing a non-disruptive code load in accordance with the present invention.

FIG. 5 depicts a method 200 for providing an NDCL which utilizes the method 100 for providing the trusted machine state. Operation is suspended via step 210. The trusted machine state existing in a first portion of memory 19 is stored in a second portion of memory via step 220. This step is analogous to the step 110 of the method 100. The new version of code is loaded via step 230. A part of the memory 19 is reinitialized via step 240. The part of the memory 19 that is reinitialized in step 240 is separate from the second part of memory in which the trusted machine state is stored. This step is analogous to the step 120 of the method 100. In one embodiment, the part of the memory 19 that is reinitialized includes the first portion of the memory 19 in which the trusted machine state existed. In a preferred embodiment, the part of the memory 19 that is reinitialized is as much of the memory 19 as can be reinitialized without too great a disruption in operation of the subsystem 14. The trusted machine state is then restored via step 250. The step 250 is analogous to the step 130 of the method 100. Operation can then be resumed using the new version of code via step 260.

Note that although the same code can be used to save the trusted machine state, reinitialize the memory 19, and restore the trusted machine state in both the method 100 and the method 200, the method and system function effectively when different methods are used. For example, recovery from an error could be accomplished using the method 100 where, in step 110, the data constituting the trusted machine state is stored directly from the first portion of memory to the second portion of memory. In the same system, an NDCL could be achieved via the method 200 where, in step 220, the data is encoded prior to storage in the second portion of memory. In a preferred embodiment, however, the method 100 used to save and restore a trusted machine state, for example to recover from errors, is a substantially the same as corresponding steps in the method 200 for providing an NDCL.

Figure 6A:
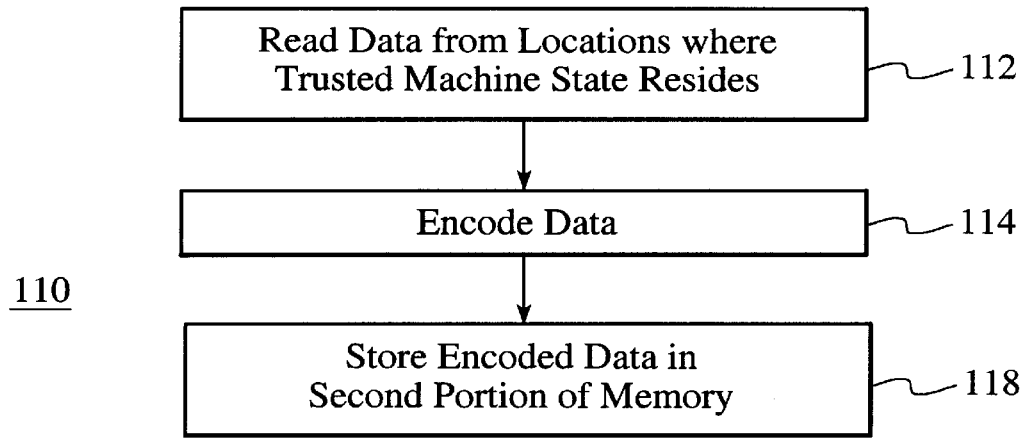
FIG. 6A is a flow chart depicting a method for storing a trusted machine state in accordance with the present invention.

FIG. 6A depicts a more detailed flow chart of a preferred embodiment of the step 110 of storing the trusted machine state. Because step 220 is analogous to the step 110, FIG. 6A can also be viewed as depicting step 220 of the method 200. The data constituting the trusted machine state is first read from the first portion of memory via step 112. In one embodiment, step 112 is performed by reading data in particular addresses in the memory 19. The data is then encoded via step 114. The encoded data is then stored in the second portion of memory via step 118. In a preferred embodiment, the encoded data is stored in the memory 19 rather than being transferred to another storage medium.

Figure 6B:
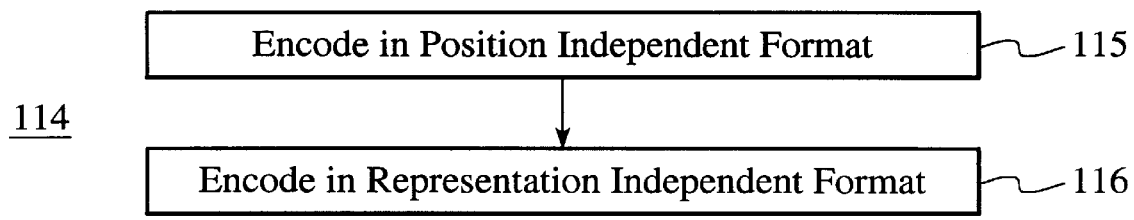
FIG. 6B is a flow chart depicting a method for encoding the trusted machine state in accordance with the present invention.

FIG. 6B depicts a preferred embodiment of the step 114 of encoding the data for the trusted machine state. Note that because step 110, of which step 114 is a part, is analogous to step 220, the step 114 could also be used in providing a NDCL. The data is encoded in a position independent format via step 115. In one embodiment, this means that the encoded trusted machine state does not contain references to specific addresses. In a preferred embodiment, the encoded trusted machine state is also independent of the name of a particular variable. The data may also be encoded in a representation independent format via step 116.

Figure 6C:
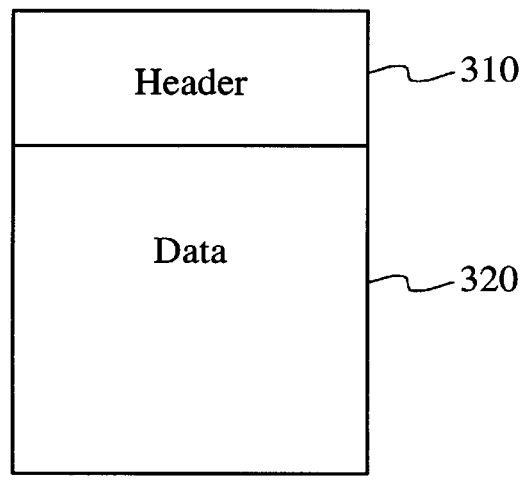
FIG. 6C is a block diagram of one portion of a trusted machine state in an encoded format.

In a preferred embodiment step 115 is performed by storing a portion of the trusted machine state in a record consisting of a header followed by values for the data. FIG. 6C is a block diagram of one portion of a trusted machine state in an encoded format. Thus, FIG. 6C depicts a record including a header 310 and following data 320. The header 310 indicates what the data being stored represent. For example, the header 310 may indicate that the following data 320 identifies a path to a host 11, 12, or 13, or the header 310 may indicate that the following data 320 represents whether the disk subsystem 14 is in a write enabled state. In other words, the header 310 may capture the essence of the portion of the trusted machine state. The header 310 identifies how the portion of the trusted machine state stored in the following data 320 is to be used without reference to the address within the first portion of the memory 19 from which the data was read or how the data elements in the following data 320 were arranged in the memory 19. As a result, an NDCL can be facilitated. For example, if the header merely indicates that the following data 320 represents thirty-two flag bits, both versions of code in an NDCL must be aware of what each bit represents. This makes it difficult for the NDCL process to handle changes that arise from one version of the code to another in what the flag bits mean or how the flag bits are arranged in the memory 19. However, if the header indicates what each flag bit represents, the restoring of the trusted machine state via step 250 can be performed more easily. The data 320 following the header defines the actual state of the variable identified by the header. In a preferred embodiment, the header 310 contains a plurality of numbers. Each number selects an entry in a lookup table (not shown) which indicates what the data represents. Thus, the encoded version of each part of the trusted machine state indicates what variable the data represents as well as the actual values of the variable. In a preferred embodiment, the encoded version of the trusted machine state does not contain references to addresses.

The position independent format for the encoded trusted machine state simplifies the process of preserving the trusted machine state across a NDCL. Before the new version of code is loaded, the old version of code saves a position independent representation of the trusted machine state. After the new version of code is loaded, the new version of code interprets the records saved by the old version of code and writes the saved trusted machine state into the new code's variables. The memory addresses of the old version of code's variables and the new version of code's variable may differ, but the differences have essentially no effect on the processes of saving and restoring the trusted machine state. Moreover, using the header 310 to reference what the variable represents rather than the name of the variable allows the name of each variable to be changed between version of code.

In a preferred embodiment, the step 116 of storing the portion of the trusted machine state in a representation independent format includes indicating the representation of the portion of the trusted machine state. Storing the portion of the trusted machine state in a representation independent format is particularly useful in allowing an NDCL to be performed using the method 200.

In one embodiment, when the trusted machine state is stored in a representation independent format, the representation of the trusted machine state can be changed between versions of code. During encoding of the trusted machine state by the old code, via step 220 of the method 200, the representation of the trusted machine state is indicated. The new code can take this representation independent format and, using the information regarding the representation used in the old version of code, determine the representation of the stored trusted machine state. The new version of code can then translate the stored trusted machine state to a new representation via step 250. For example, in an old version of the code a portion of the trusted machine state, such as a particular variable, may be stored in a single byte in memory. In a new version of code, this variable may be stored in a word consisting of several bytes. When the variable is encoded via step 116, the header 310 can indicate whether the variable is stored as a byte or a word. When the trusted machine state is restored via step 250, the variable can be converted between byte representation and word representation. If the conversion is from word representation to byte representation, the step 250 which restores the trusted machine state may also detect whether the value stored exceeds the range of values which can be represented in a byte. In this case, the variable may be restored to an acceptable state using some other means or the method 200 may stop and report that the initialization process has failed.

Encoding the data in a representation independent format via step 116 also allows information represented by a series of flag bits stored in various data structures to be saved and restored. Rather than separately storing the flag bits, the information represented by these flag bits can encoded via steps 114 and/or 116 as a single item in position independent and/or representation independent format. As a result, the position and meaning of the flag bits can be changed from one version of the code to the next without preventing an NDCL from being performed. Moreover, additional flag bits can be inserted by the new version of code. This is possible because the old version of code, which saves the trusted machine state, does not need to know about the way that the information will be represented in the new version of code which restores the information and vice versa.

Referring back to FIG. 4, in one embodiment, reinitialization via step 120 is performed by writing a reinitialization pattern in each address in memory that is being reinitialized. This pattern destroys the contents of memory locations which are being reinitialized. This step removes any data in these locations which may have caused an error which halted operation. Thus, a system employing the method 100 can recover from certain faults which halted normal operation. In a preferred embodiment, the reinitialization pattern chosen differs from other values written to the addresses being reinitialized. For example, a reinitialization pattern which indicates an illegal memory address can be chosen so a developer can ensure that correct data is written to each location in the memory 19 after reinitialization. For example, a developer could print the contents of the memory 19 after reinitialization. The developer could then search for the reinitialization pattern. The reinitialization pattern will appear in those addresses in which data has not been stored after reinitialization. A developer can, therefore, determine whether the appropriate data is stored in the memory 19. Also in a preferred embodiment, the reinitialization pattern is substantially the same as a initialization pattern written to the memory 19 when the system 14 first starts up.

Figure 7A:
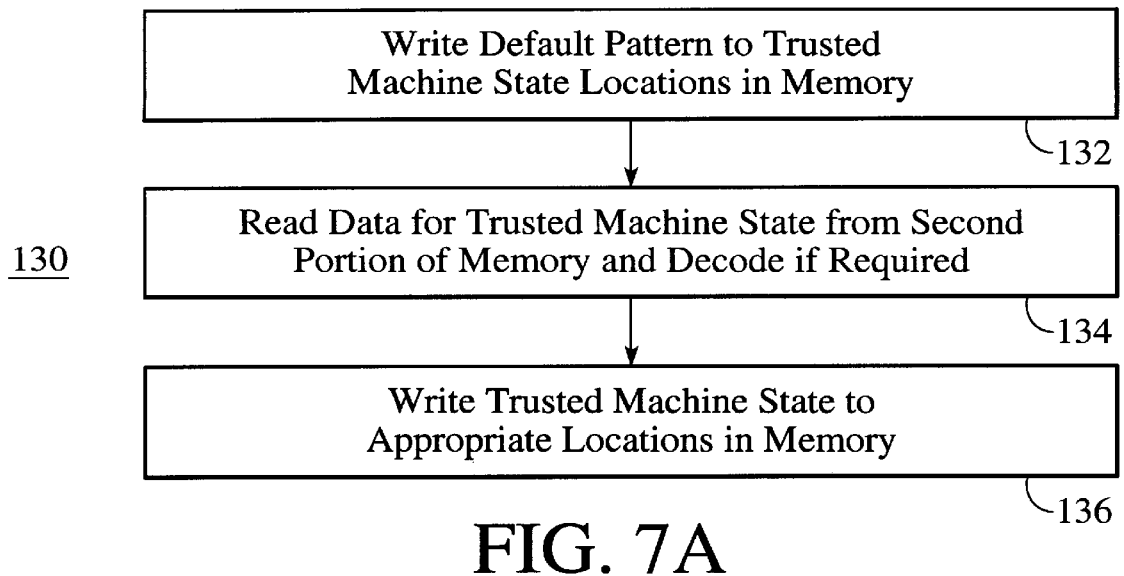
FIG. 7A is a flow chart depicting a method for restoring the trusted machine state in accordance with the present invention.

Referring now to FIG. 7A, a more detailed flow chart of the step 130 of restoring the trusted machine state is depicted. A default pattern is written to locations in the memory 19 which will hold each part of the trusted machine state via step 132. The default pattern can be tailored for each location in the memory 19. The saved trusted machine state is then read from the second portion of memory via step 134. In an embodiment in which the trusted machine state is encoded in position or representation independent format, the step 134 includes decoding the data for each part of the trusted machine state. Thus, the step 134 might be implemented as a loop, which decodes one part of the trusted machine state each time the loop is performed. In one embodiment, the step 134 also includes checking the data for errors. Using the header 310, it is determined what the values that will follow the header 310 represent. The following data 320 is also read via step 134. In a preferred embodiment, each piece of the following data 320 can be separated where necessary. For example, where the following data 320 includes a plurality of flag bits, the bits can be separated to be written in different addresses in the memory 19. The trusted machine state is then written into the appropriate locations in memory 19 via step 136. As a result of the steps 134 and 136, each piece of the trusted machine state is read, the meaning and actual values for each piece of the trusted machine state are determined, and the values are distributed in the appropriate locations in the memory 19.

Figure 7B:
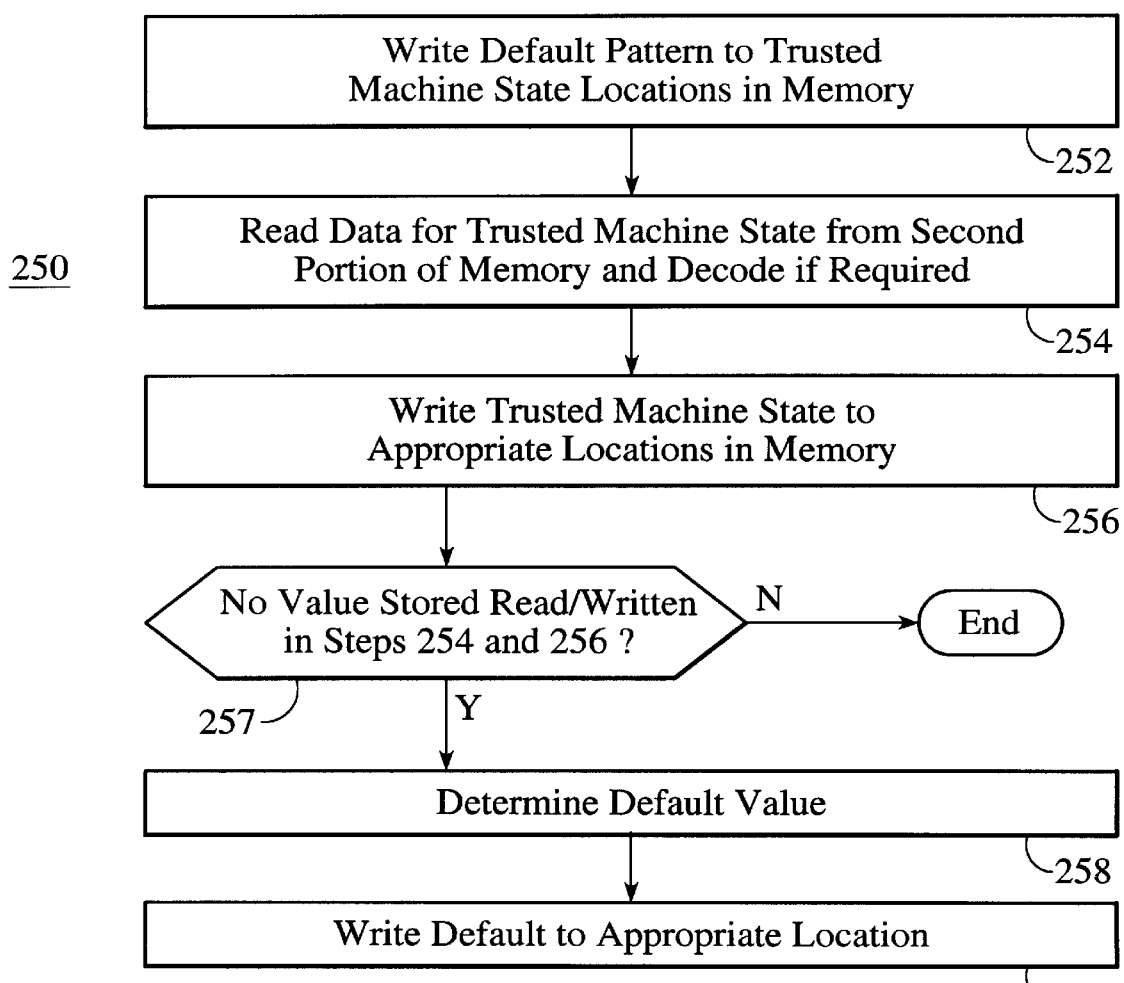
FIG. 7B is a flow chart depicting a method for restoring the trusted machine state that is particularly useful when an NDCL is performed in accordance with the present invention.

Referring now to FIG. 7B, a more detailed flow chart of the step 250 of restoring the trusted machine state is depicted. The steps 252 through 256 are analogous to the steps 132 through 136. In one embodiment of an NDCL, once the trusted machine state is written to the appropriate locations in memory, then via step 257 it is determined if a variable that is part of the new version of code's trusted machine state has not been read or written in steps 254 and 256. In a preferred embodiment, step 257 is performed by keeping a list of items which make up the trusted machine state, checking off items on the list as steps 254 and 256 are performed for the item, and determining whether all items on the list have been checked off. If the contents of a variable have not been read from the saved trusted machine state and written to the memory 19 during steps 254 and 256, then a default value for the variable is determined via step 258. In a preferred embodiment, step 258 is performed by determining the appropriate default value using the remainder of the trusted machine state read and written via steps 254 and 256. However, nothing prevents the use of a static default value. This default value is then written to the variable's location via step 259.

Through the steps 257 through 259, the existence of a new variable can be taken into account during an NDCL performed using the method 200. Because the old version of code did not have the variable, nothing is saved for this variable during the step 220 of the method 200. Using steps 257 through 259, the new variable is identified and provided with an appropriate default value. As a result, new variables can be added in a new version of code. In addition, these new variables can be initialized to something other than the reinitialization pattern. Thus, an NDCL can be performed using the method 200 without either the reinitialization value or some other value that causes a failure being stored in the location for the new variable.

Because the methods 100 and 200 are used for providing a trusted machine state and performing an NDCL, respectively, it is much more difficult to encounter an unintended trusted machine state. Thus, errors due to unintended trusted machine states are reduced both in recovering from an error and in an NDCL. In addition, encoding the trusted machine state provides a great deal of flexibility. This flexibility facilitates providing an NDCL.

The process of saving and restoring the trusted machine state via the method 100 or the method 200 also provides an opportunity to check the trusted machine state for errors and inconsistencies. It may be better to determine that information preserved is incorrect than to blindly save and restore incorrect information in the trusted machine state which causes a failure shortly after reinitialization is complete. Once it has been determined that a portion of the trusted machine state includes incorrect information, other techniques may be employed to recover from a failure. If recovery from the error is not possible, operation can be suspended and the unrecoverable failure can be reported to a user. In the conventional method 20, where the trusted machine state is defined by a failure to reinitialize rather than by saving and reading the trusted machine state, it is difficult to ensure that all of the trusted machine state has been examined and found to be correct and consistent.

Although the method 100 need not be incorporated into an NDCL, there is a benefit to using the same technique to save and restore the trusted machine state for an NDCL, as in the method 200. Using the same technique for both recovery from errors and an NDCL saves development time and test time. Similar steps save and restore trusted machine state in both cases. Thus, the steps 220, 240, and 250 are analogous to the steps 110, 120, and 130. Tests which examine and verify the ability to recover from certain errors using a trusted machine state can also test many of the steps used during the NDCL process 200. Ensuring that all of the trusted machine state has been identified and all other variables are reinitialized improves the reliability of both the process for recovering from certain errors and the NDCL method 200.

A method and system has been disclosed for providing a trusted machine state. Software written according to the present invention may be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a trusted machine state in a data processing system including a memory, the trusted machine state being stored in a first portion of the memory, the first portion of the memory including a first plurality of locations, the method comprising the steps of:
   (a) saving the trusted machine state in a second portion of the memory, the saving step (a) further including the steps of
      (a1) reading the trusted machine state from the first plurality of locations;
      (a2) encoding the trusted machine state in a format that is independent of the first plurality of locations; and
      (a3) writing the encoded trusted machine state to the second portion of memory;
   (b) reinitializing a portion of the memory that is separate from the second portion of the memory; and
   (c) restoring the trusted machine state in the memory, the restoring step (c) further including the steps of
      (c1) reading the trusted machine state from the second portion of the memory; and
      (c2) writing the trusted machine state to a third portion of the memory.

2. The method of claim 1 wherein the trusted machine state further includes information relating to a plurality of variables, each variable having a name, and wherein the encoding step (a2) further includes the step of:
   (a2i) encoding the trusted machine state in a format that is independent of the name of each of the plurality of variables.

3. The method of claim 2 wherein the saving step (a) further comprises the step of:
   (a2ii) encoding information relating to a particular variable of the plurality of variables into a format including a header indicating what the particular variable represents and at least one value indicating a state of the particular variable.

4. The method of claim 1 wherein the saving step (a) further comprises the step of:
   (a2i) encoding the trusted machine state in a representation independent format.

5. The method of claim 4 wherein the saving step (a) further comprises the step of:
   (a2ii) noting a representation for each of the plurality of variables.

6. The method of claim 1 wherein the first portion of the memory and the third portion of the memory are the same.

7. The method of claim 1 wherein the reinitializing step (b) further comprises the step of:
   (b1) writing a reinitialization pattern to each of a plurality of addresses in the portion of the memory separate from the second portion of the memory.

8. The method of claim 1 wherein the writing step (c2) further comprises the step of:
   (c2i) writing a first default pattern into each of a plurality of addresses in the third portion of the memory.

9. The method of claim 8 wherein the writing step (c2) further comprises the step of:
   (c2ii) writing the trusted machine state into the third portion of the memory.

10. The method of claim 9 wherein the first portion of the memory and the third portion of the memory are the same.

11. The method of claim 9 further comprising the step of:
    (d) loading a version of code.

12. The method of claim 11 wherein the code loading step (d) further comprises the step of:
    (d1) loading the version of code prior to the completion of reinitializing step (b).

13. The method of claim 12 wherein the trusted machine state further includes information relating to a plurality of variables and wherein writing step (c2) further comprises the step of:
    (c2iii) determining if information relating to a variable of the plurality of variables has not been written via step (c2ii); and
    (c2iv) if the information relating to the variable has not been written
       (c2iv-1) determining a value to store in the variable based on information relating the plurality of variables; and
       (c2iv-2) writing the value.

14. The method of claim 1 wherein the restoring step (c) further includes the step of:
    (c3) decoding the encoded trusted machine state.

15. A data processing system for providing a trusted machine state, the data processing system including a memory, the memory including a first plurality of locations, the trusted machine state being stored in a first portion of the memory, the data processing system comprising:
    means for saving the trusted machine state in a second portion of the memory, the saving means further including
       means for reading the trusted machine state from the first plurality of locations;
       means for encoding the trusted machine state in a format that is independent of the first plurality of locations; and
       means for writing the encoded trusted machine state to the second portion of memory;
    means for reinitializing a portion of the memory separate from the second portion of memory; and
    means for restoring the trusted machine state in the memory, the restoring means further including
       means for reading the trusted machine state from the second portion of the memory; and
       means for writing the trusted machine state to a third portion of the memory.

16. The system of claim 14 wherein the trusted machine state further includes information relating to a plurality of variables, each variable having a name, and wherein the encoding means further includes:

means for encoding the trusted machine state in a format that is independent of the name of each of the plurality of variables.

17. The system of claim 16 wherein the saving means further comprises:

means for encoding information relating to a particular variable of the plurality of variables into a format including a header indicating what the particular variable represents and at least one value indicating a state of the particular variable.

18. The system of claim 17 wherein the saving means further comprises:

means for encoding the trusted machine state in a representation independent format.

19. The system of claim 18 wherein the saving means further comprises:

means for noting a representation for each of the plurality of variables.

20. The system of claim 15 wherein the first portion of the memory and the third portion of the memory are the same.

21. The system of claim 15 wherein the reinitializing means further comprises:

means for writing a reinitialization pattern to each of a plurality of addresses in the portion of the memory.

22. The system of claim 15 where the writing means further comprises:

means for writing a first default pattern into each of a plurality of addresses in the third portion of the memory.

23. The system of claim 22 wherein the writing means further comprises:

means for writing the trusted machine state into the third portion of the memory.

24. The system of claim 23 wherein the first portion of the memory and the third portion of the memory are the same.

25. The system of claim 23 further comprising:

means for loading a version of code.

26. The system of claim 25 wherein the means for loading further comprises:

means for loading the version of code prior to the completion of reinitialization.

27. The system of claim 26 wherein the trusted machine state further includes information relating to a plurality of variables and wherein the writing means further comprises:

means for determining if information relating to a variable of the plurality of variables has not been written; and means for determining a value to store in the variable based on information relating the plurality of variables and writing the value if the information relating to the variable has not been written.

28. The system of claim 27 wherein the system is a computer disk subsystem.

29. The system of claim 15 wherein the restoring means further includes:

means for decoding the encoded trusted machine state.

30. A computer-readable medium containing a program for providing a trusted machine state in a data processing system including a memory, the memory including a first plurality of locations, the trusted machine state being stored in a first portion of the memory, the program containing instructions for:

(a) saving the trusted machine state in a second portion of the memory the saving instruction (a) further including instructions for (a1) reading the trusted machine state from the first plurality of locations;

(a2) encoding the trusted machine state in a format that is independent of the first plurality of locations; and (a3) writing the encoded trusted machine state to the second portion of memory;

(b) reinitializing a portion of the memory separate from the second portion of memory;

(c) restoring the trusted machine state in the memory, the restoring instructions (c) further including instructions for (c1) reading the trusted machine state from the second portion of the memory; and (c2) writing the trusted machine state to a third portion of the memory.

31. The computer-readable medium of claim 30 wherein the trusted machine state further includes information relating to a plurality of variables, each variable having a name, and wherein the instruction for encoding (a2) further includes an instruction for:

(a2i) encoding the trusted machine state in a format that is independent of the name of each of the plurality of variables.

32. The computer-readable medium of claim 31 wherein the instruction for saving (a) further comprises an instruction for:

(a2ii) encoding information relating to a particular variable of the plurality of variables into a format including a header indicating what the particular variable represents and at least one value indicating a state of the particular variable.

33. The computer-readable medium of claim 28 wherein the instruction for saving (a) further comprises an instruction for:

(a2i) encoding the trusted machine state in a representation independent format.

34. The computer-readable medium of claim 33 wherein the instruction for saving (a) further comprises an instruction for:

(a2ii) noting a representation for each of the plurality of variables.

35. The computer-readable medium of claim 30 wherein the first portion of the memory and the third portion of the memory are the same.

36. The computer-readable medium of claim 30 wherein the instruction for reinitializing (b) further comprises instructions for:

(bi) writing a reinitialization pattern to each of a plurality of addresses in the portion of the memory separate from the second portion of the memory.

37. The computer-readable medium of claim 30 wherein the instruction for writing (c2) further comprises an instruction for:

(c2i) writing a first default pattern into each of a plurality of addresses in the third portion of the memory.

38. The computer-readable medium of claim 37 wherein the instruction for writing (c2) further comprises an instruction for:

(c2ii) writing the trusted machine state into the third portion of the memory.

39. The computer-readable medium of claim 38 wherein the first portion of the memory and the third portion of the memory are the same.

40. The computer-readable medium of claim 38 wherein the program further comprises an instruction for:

(d) loading a version of code.

41. The computer-readable medium of claim 40 wherein the instruction for loading the version of code further comprises an instruction for:

(d1) loading the version of code prior to the completion of reinitializing using instruction (b).

42. The computer-readable medium of claim 41 wherein the trusted machine state further includes information relating to a plurality of variables and wherein the instruction for writing (c2) further comprises instructions for:

(c2iii) determining if information relating to a variable of the plurality of variables has not been written via step (c2ii); and (c2iv) if the information relating to the variable has not been written
 (c2iv-1) determining a value to store in the variable based on information relating the plurality of variables; and
 (c2iv-2) writing the value.

43. The computer-readable medium of claim 30 wherein the restoring instructions (c) further includes instructions for:

(c3) decoding the encoded trusted machine state.

* * * * *